US009979510B2

(12) United States Patent
Patel et al.

(10) Patent No.: US 9,979,510 B2
(45) Date of Patent: May 22, 2018

(54) APPLICATION TIMEOUT AWARE TCP LOSS RECOVERY

(71) Applicant: Brocade Communications Systems, Inc., San Jose, CA (US)

(72) Inventors: Maulik Patel, Bangalore (IN); Andy Dooley, Rogers, MN (US); Isaac Larson, Minneapolis, MN (US)

(73) Assignee: Brocade Communications Systems LLC, San Jose, CA (US)

( * ) Notice: Subject to any disclaimer, the term of this patent is extended or adjusted under 35 U.S.C. 154(b) by 196 days.

(21) Appl. No.: 14/811,669

(22) Filed: Jul. 28, 2015

(65) Prior Publication Data

US 2017/0034060 A1    Feb. 2, 2017

(51) Int. Cl.
  *H04L 1/16*    (2006.01)
  *H04L 12/801*  (2013.01)
  *H04L 12/807*  (2013.01)

(52) U.S. Cl.
  CPC ............ *H04L 1/1607* (2013.01); *H04L 47/27* (2013.01); *H04L 47/37* (2013.01)

(58) Field of Classification Search
  CPC ........ H04L 69/16; H04L 47/10; H04L 69/163
  See application file for complete search history.

(56) References Cited

U.S. PATENT DOCUMENTS

| 8,724,471 B2 * | 5/2014 | Noureddin | H04L 47/12 370/235 |
| 9,276,866 B2 * | 3/2016 | Wu | H04L 47/36 |

* cited by examiner

*Primary Examiner* — Chandrahas B Patel
(74) *Attorney, Agent, or Firm* — Blank Rome, LLP (57) ABSTRACT

The SACK scoreboard is used in slow recovery and the SACK scoreboard and an application programmed timeout are used to determine the initial CWND in slow recovery. The CWND is calculated so that all packets will be recovered before the application times out. A new socket option is provided for an application to program an application timeout (say APP_TO). This value is used in conjunction with the RTT (round trip time) to determine the initial CWND value to insure completion before timeout. Along with the timeout, the application can also set the mode as "soft," where the CWND value is set to "1" as conventional but when that packet is ACKed, the CWND value is increased immediately to a modified calculated value to allow timely recovery.

14 Claims, 6 Drawing Sheets

APPLICATION TIMEOUT AWARE TCP LOSS RECOVERY

BACKGROUND OF THE INVENTION

1. Field of the Invention

The invention relates to network transmission using the TCP protocol.

2. Description of the Related Art

When packets are lost in the network, TCP (transmission control protocol) first resorts to fast retransmit procedures to recover the loss. TCP SACK (selective acknowledgement) is one of the fast retransmit mechanisms. If the loss is not recovered by fast retransmit, the RTO (Retransmit Time Out) is triggered, which puts TCP in slow recovery, and an attempt is made to recover the loss. In conventional slow recovery, CWND (congestion window size) is set to '1' and packet retransmission begins from SND.UNA (Send Unacknowledged), the last unacknowledged segment in the transmit buffer. The number of RTTs (round trip times) slow recovery will take to recover the loss is proportional to the number of packets lost in the recovery window. On a long fat network (LFN), even a moderate packet loss can result in a long slow recovery phase because of high numbers of packets getting lost. There are no new data flows during slow recovery phase, only retransmission of data. Thus the traditional slow recovery approach may trigger an application timeout on a high latency network. Also, existing TCP implementations do not use SACK in slow recovery.

SUMMARY OF THE INVENTION

In embodiments according to the present invention the SACK scoreboard is used in slow recovery and the SACK scoreboard and an application programmed timeout are used to determine the initial CWND in slow recovery. The CWND is calculated so that all packets will be recovered before the application times out. A new socket option is provided for an application to program an application timeout (APP_TO). This value is used in conjunction with the RTT (round trip time) to determine the initial CWND value to insure completion before timeout. Along with the timeout, the application can also set the mode as "soft," where the CWND value is set to "1" as conventional but when that packet is ACKed, the CWND value is increased immediately to the calculated value to allow timely recovery.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTIONS

Figure 1:
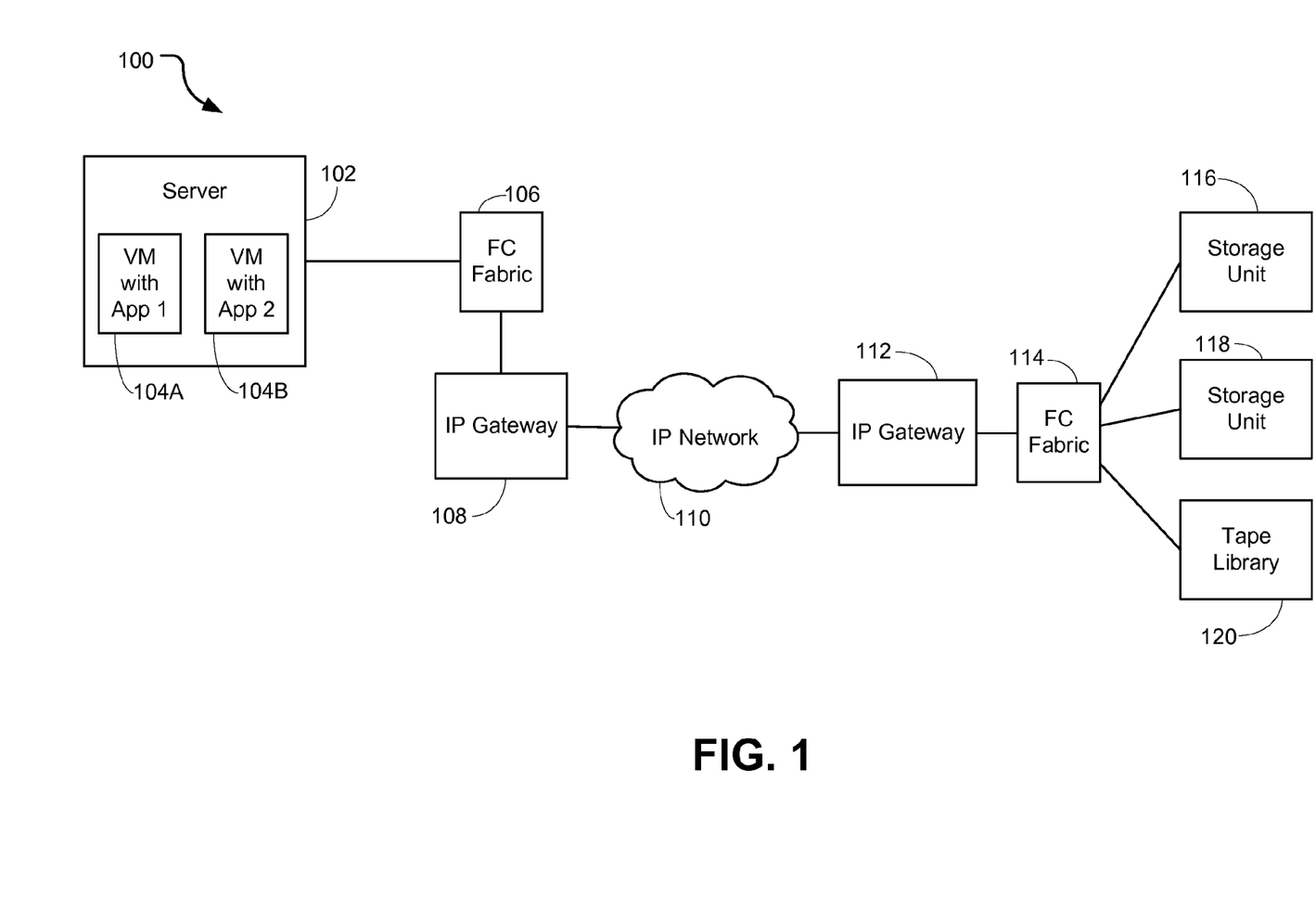
FIG. 1 is a block diagram of a network for operation according to the present invention.

Referring now to FIG. 1, an exemplary network 100 according to a first embodiment is shown. A server or host 102 containing two virtual machines (VMs) 104A, 104B, each VM 104A, 104B having an application executing in the VM, is connected to a Fibre Channel (FC) fabric 106. The FC fabric 106 is connected to an IP (Internet protocol) gateway 108, preferably an FCIP gateway. The IP gateway 108 is connected to an IP network 110, which acts as a wide area network (WAN). A second IP gateway 112 is connected to the IP network 110 to communicate with the IP gateway 108. The IP gateway 112 is connected to an FC fabric 114. According to normal FCIP operation the two FC fabrics 106 and 114 are a merged FC fabric, with the IP gateways connecting the two portions. Various storage units 116, 118 and a tape library 120 are connected to the FC fabric 114 to act as targets for the server 102.

Figure 2:
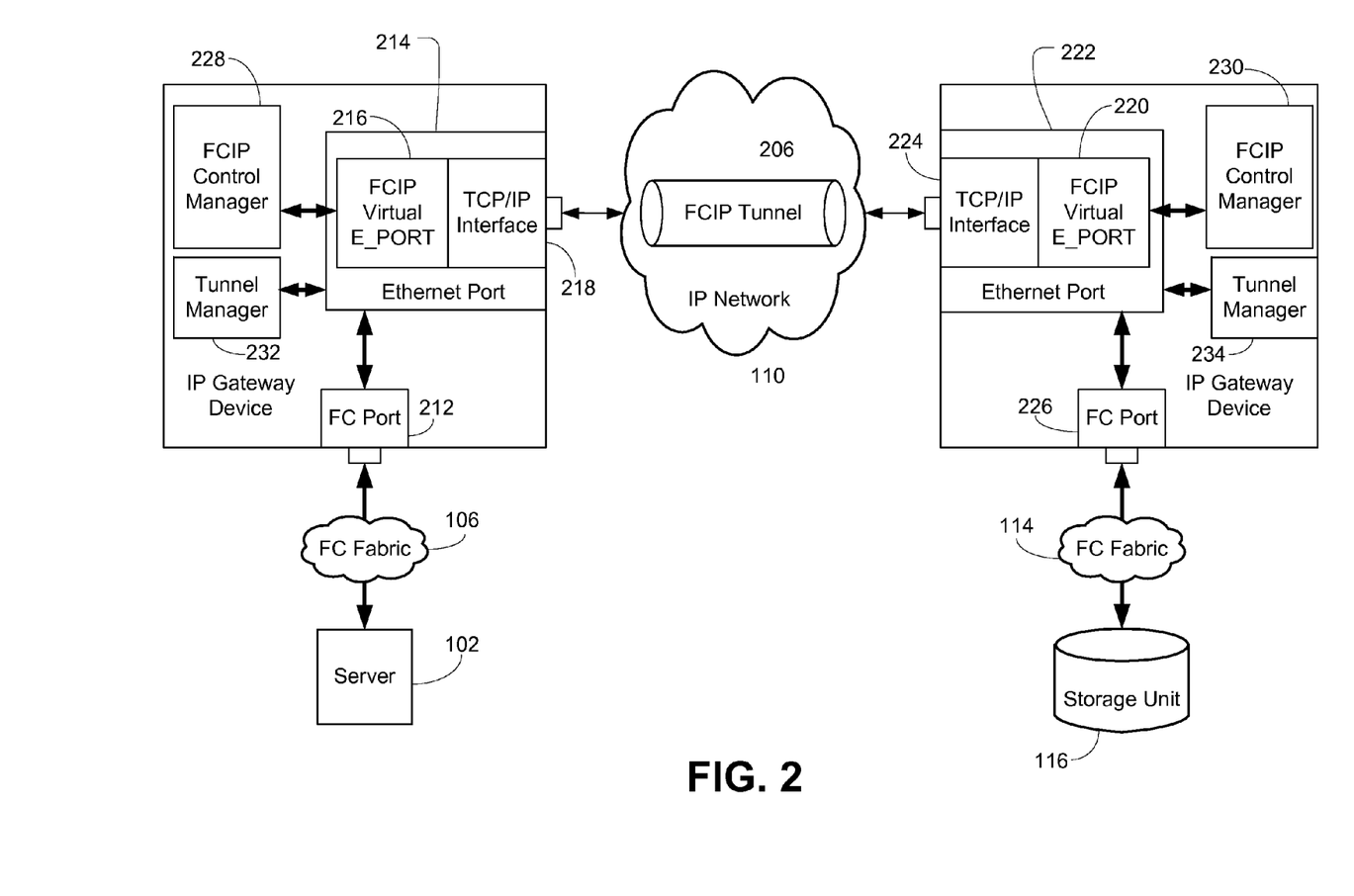
FIG. 2 is a more detailed block diagram of portions of the block diagram of FIG. 1.

FIG. 2 illustrates example IP gateway devices 108 and 112 (e.g., FCIP extension devices) communicating over the IP network 110 through an FCIP tunnel 206. The server 102 is configured to send data to the storage unit 116 through the IP network 110.

The server 102 couples to an FC port 212 of the IP gateway device 108. The coupling may be made directly between the FC port 212 and the server 102 or indirectly through an FC fabric 106. The FC port 212 receives FC frames from the server 102 and forwards them to an Ethernet port 214, which includes an FCIP virtual E_PORT 216 and a TCP/IP interface 218 coupled to the IP network 110. The FCIP virtual E_PORT 216 acts as one side of the logical ISL formed by the FCIP tunnel 206 over the IP network 110. An FCIP virtual E_PORT 220 in the IP gateway device 112 acts as the other side of the logical ISL. The Ethernet port 214 encapsulates each FC frame received from the FC port 212 in a TCP segment and an IP packet shell and forwards them over the IP network 110 through the FCIP tunnel 206.

The storage unit 116 couples to an FC port 226 of the IP gateway device 112. The coupling may be made directly between the FC port 226 and the storage unit 116 or indirectly through an FC fabric 114. An Ethernet port 222 receives TCP/IP-packet-encapsulated FC frames over the IP network 110 from the IP gateway device 108 via a TCP/IP interface 224. The Ethernet port 222 de-encapsulates the received FC frames and forwards them to an FC port 226 for communication to the storage unit 116.

It should be understood that data traffic can flow in either direction between the server 102 and the storage unit 116. As such, the roles of the IP gateway devices 108 and 112 may be swapped for data flowing from the storage unit 116 and the server 102.

Tunnel manager modules 232 and 234 (e.g., circuitry, firmware, software or some combination thereof) of the IP gateway devices 108 and 112 set up and maintain the FCIP tunnel 206. Either IP gateway device 108 or 112 can initiate the FCIP tunnel 206, but for this description, it is assumed that the IP gateway device 108 initiates the FCIP tunnel 206. After the Ethernet ports 214 and 222 are physically connected to the IP network 110, data link layer and IP initialization occur. The TCP/IP interface 218 obtains an IP address for the IP gateway device 108 (the tunnel initiator) and determines the IP address and TCP port numbers of the remote IP gateway device 112. The FCIP tunnel parameters may be configured manually, discovered using Service Location Protocol Version 2 (SLPv2), or designated by other means. The IP gateway device 108, as the tunnel initiator, transmits an FCIP Special Frame (FSF) to the remote IP gateway device 112. The FSF contains the FC identifier and the FCIP endpoint identifier of the IP gateway device 108, the FC identifier of the remote IP gateway device 112, and a 64-bit randomly selected number that uniquely identifies the FSF. The remote IP gateway device 112 verifies that the contents of the FSF match its local configuration. If the FSF contents are acceptable, the unmodified FSF is echoed back to the (initiating) IP gateway device 108. After the IP gateway device 108 receives and verifies the FSF, the FCIP tunnel 206 can carry encapsulated FC traffic.

Each IP gateway device 108 and 112 includes an FCIP control manager (see FCIP control managers 228 and 230), which generate the class-F control frames for the control data stream transmitted through the FCIP tunnel 206 to the FCIP control manager in the opposing IP gateway device. Class-F traffic is connectionless and employs acknowledgement of delivery or failure of delivery. Class-F is employed with FC switch expansion ports (E_PORTS) and is applicable to the IP gateway devices 108 and 112, based on the FCIP virtual E_PORT 216 and 220 created in each IP gateway device. Class-F control frames are used to exchange routing, name service, and notifications between the IP gateway devices 108 and 112, which join the local and remote FC networks into a single FC fabric. However, the described technology is not limited to combined single FC fabrics and is compatible with FC routed environments.

The IP gateway devices 108 and 112 emulate raw FC ports (e.g., VE_PORTs or VEX_PORTs) on both ends of the FCIP tunnel 206. For FC I/O data flow, these emulated FC ports support ELP (Exchange Link Parameters), EFP (Exchange Fabric Parameters, and other FC-FS (Fibre Channel-Framing and Signaling) and FC-SW (Fibre Channel-Switched Fabric) protocol exchanges to bring the emulated FC E_PORTs online. After the FCIP tunnel 206 is configured and the TCP sessions are created for an FCIP connection in the FCIP tunnel 206, the IP gateway devices 108 and 112 will activate the logical ISL over the FCIP tunnel 206. When the ISL has been established, the logical FC ports appear as virtual E_PORTs in the IP gateway devices 108 and 112. For FC fabric services, the virtual E_PORTs emulate regular E_PORTs, except that the underlying transport is TCP/IP over an IP network, rather than FC in a normal FC fabric. Accordingly, the virtual E_PORTs 216 and 220 preserve the "semantics" of an E_PORT.

Figure 3A:
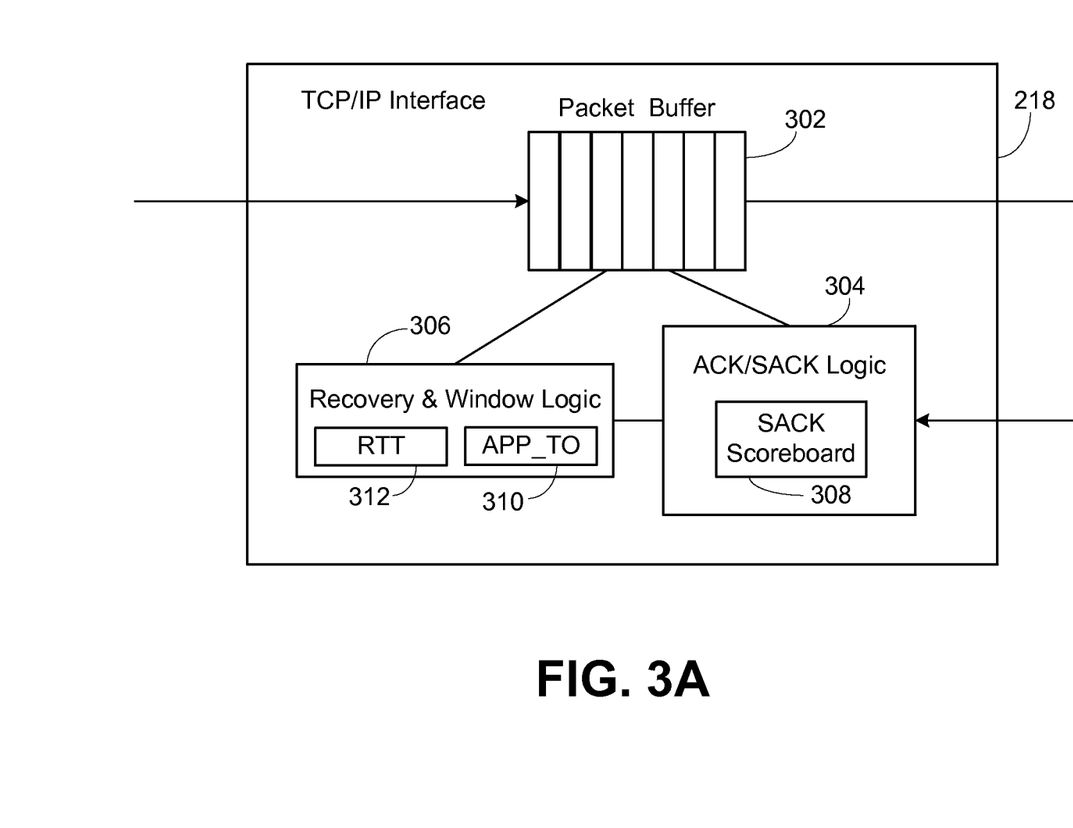
FIG. 3A is a block diagram of the transmitter TCP/IP interface of FIG. 2.

FIG. 3A is a logical block diagram of portions of the transmitter TCP/IP interface 218 according to the preferred embodiment. It is noted that this is a logical representation and actual embodiments may implemented differently, either in hardware, software executing on a processor or a combination thereof. A packet buffer 302 holds a series of TCP/IP packets to be transmitted. As is normal practice in TCP, the packets are not removed from the buffer until either an ACK (acknowledgement) for that packet is received or the packet times out. An ACK/SACK logic block 304 is connected to the packet buffer 302 and receives ACKs and SACKs from the IP network. The ACK/SACK logic block 304 is responsible for directing packets be removed from the packet buffer 302, such as by setting a flag so that the packet buffer 302 hardware can remove the packet. The ACK/SACK logic 304 includes a SACK scoreboard or register 308. The SACK scoreboard 308 maintains incoming SACK information on a per connection basis, thus providing information on which and how much information needs to be retransmitted. A recovery and window logic module 306 is connected to the packet buffer 302 and the ACK/SACK logic module 304. The recovery and window logic module 306 monitors the period each of the TCP/IP packets have been in the packet buffer 302 so that after the timeout period, as well known to those skilled in the art, timeout operations can proceed based on the particular TCP/IP packet being considered lost or otherwise not able to be received. The recovery and window logic module 306 includes an APP_TO or application timeout register 310 and a round trip time (RTT) register 312, the use of the registers 310 and 312 described below. The recovery and window logic module 306 is connected to the ACK/SACK logic module 304 to allow the ACK/SACK logic module 304 to monitor TCP/IP packet timeout status. The recovery and window logic module 306 has additional functions according to the present invention as described below.

Figure 3B:
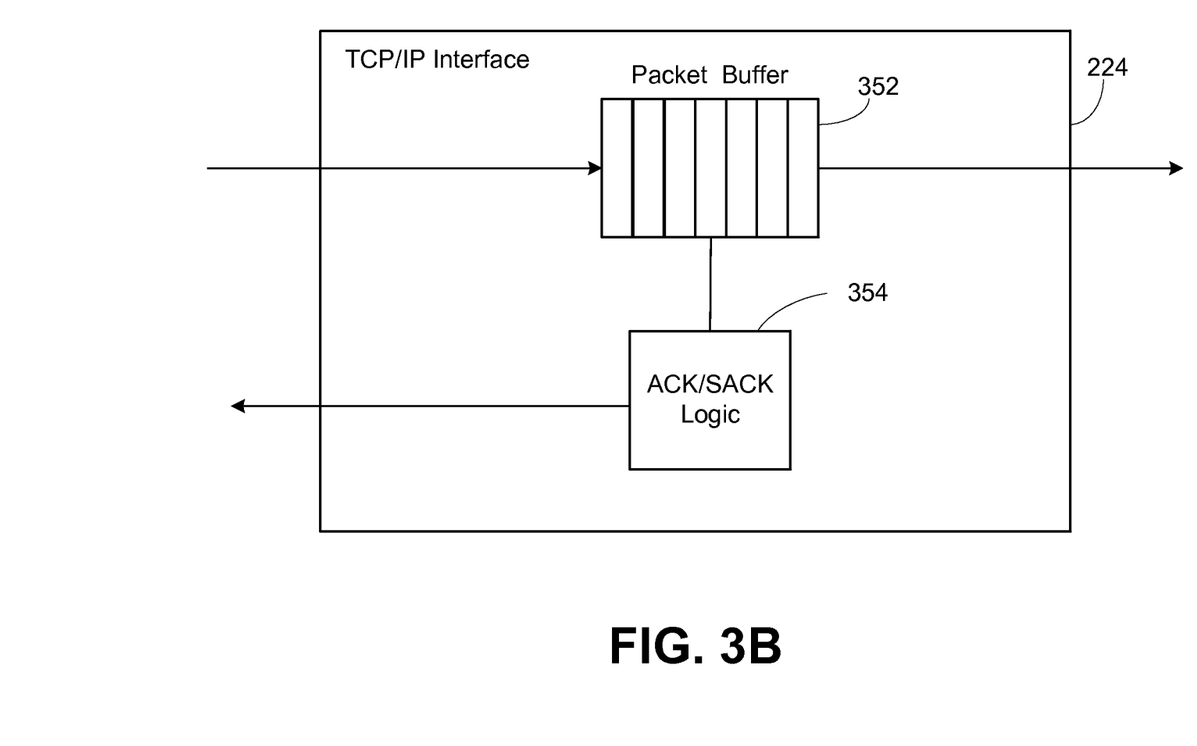
FIG. 3B is a block diagram of the receiver TCP/IP interface of FIG. 2.

FIG. 3B is a logical block diagram of portions of the receiver TCP/IP interface 224 according to the preferred embodiment. It is noted that this is a logical representation and actual embodiments may implemented differently, either in hardware, software or a combination thereof. A packet buffer 352 holds a series of TCP/IP packets that have been received. As is normal practice in TCP, the packets are not removed from the buffer if there are missing packets ahead of the packet in the sequence. An ACK/SACK logic block 354 is connected to the packet buffer 352 and generates ACKs and SACKs to the IP network 110. The ACK/SACK logic block 354 is responsible for directing packets be removed from the packet buffer 352, such as by setting a flag so that the packet buffer 352 hardware can remove the packet. The ACK/SACK logic block 354 provides ACKs and SACKs as is conventional. The packet buffer 352 informs the ACK/SACK logic block 354 when packets have been received and when packets are missing from the order to allow the ACK/SACK logic block 354 to send ACKs and SACKs are appropriate.

Embodiments according to the present invention include a modified TCP recovery method to limit application timeouts, which are very disruptive to operations. On entering slow recovery, which is done using conventional methods, if the transition to slow recovery is from fast recovery, the recorded SACK scoreboard 308 on the TCP transmitter gives a near consistent picture of the lost packets in the recovery window. With this information, it is then possible to intelligently decide the initial CWND such that the slow recovery phase is completed before APP_TO.

Figure 4A:
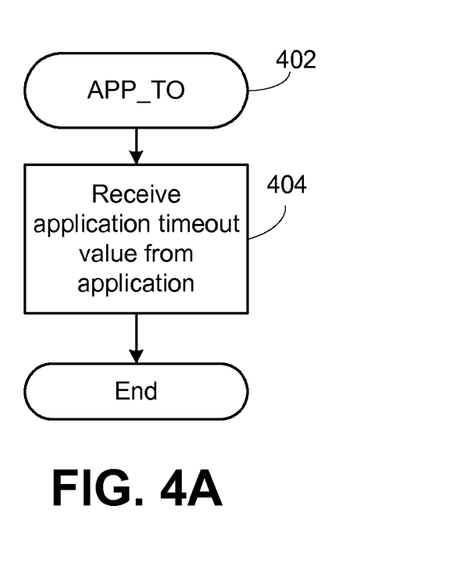
FIGS. 4A and 4B are flowcharts to obtain values used in embodiments according to the present invention.
Figure 4B:
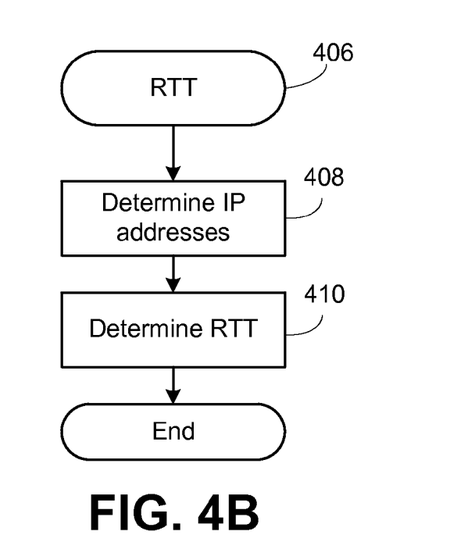

As a precursor to operations to improve recovery, referring to FIG. 4A, an APP_TO sequence 402 is shown. In step 404 the recovery and window logic module 306 receives the APP_TO or application timeout value from an application, such as the application in VM 104A or 104B. Preferably each application provides the relevant TCP ports and IP addresses being used for the particular link of interest. This can be done conveniently in the request for the TCP socket by means of a new argument in the request. The APP_TO value is stored in the APP_TO register 310. In FIG. 4B, an RTT sequence 406 is shown. In step 408 the relevant IP addresses of interest are determined so the RTT for the correct link can be determined, such as the link specified for a given APP_TO value. In step 410 the RTT for that link is determined using conventional methods. The calculated RTT value is stored in the RTT register 312 for use according to the present invention.

With the APP_TO and RTT values provided and stored, recovery operation according to the present invention can be described.

Figure 4C:
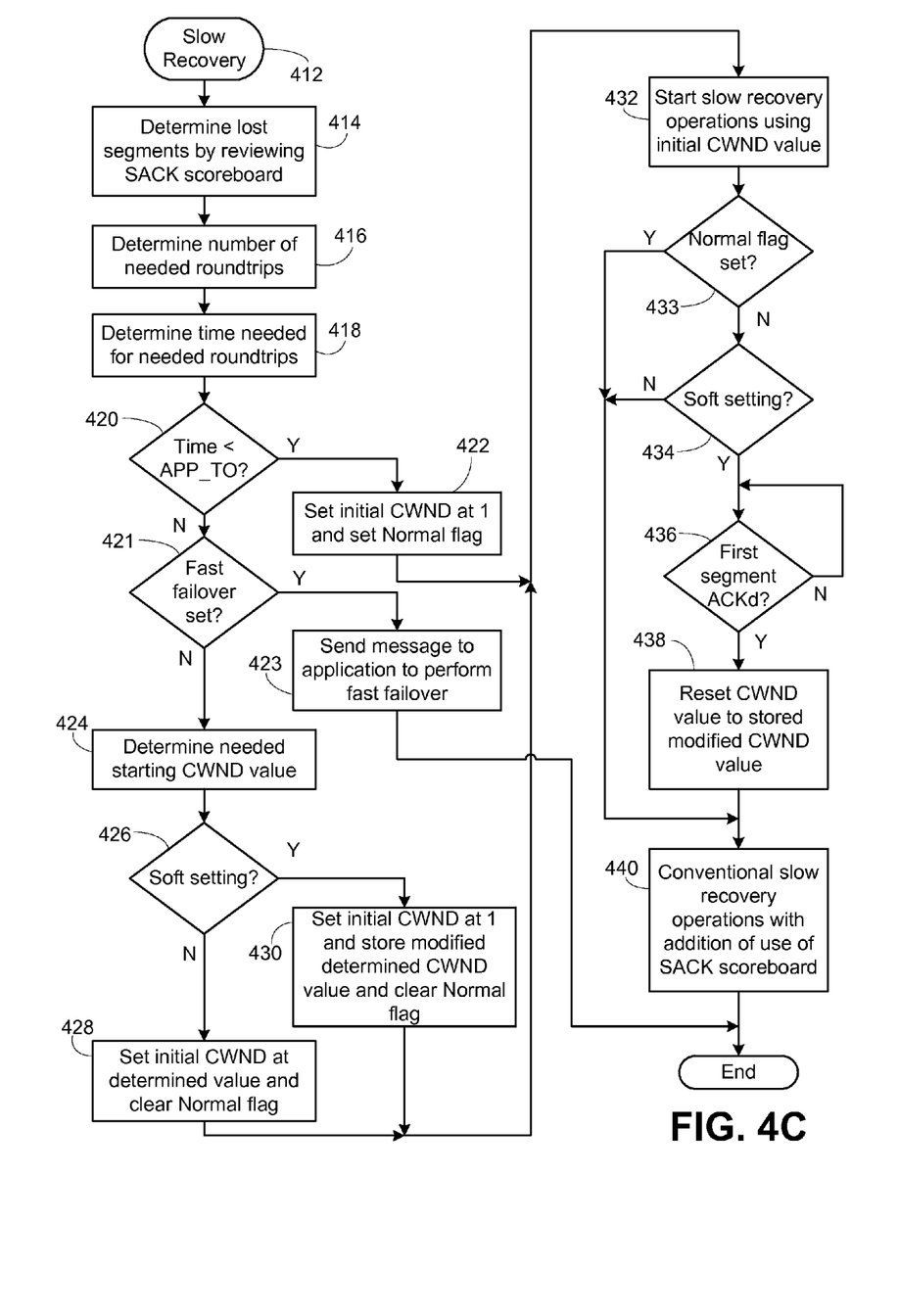
FIG. 4C is a flowchart of TCP slow recovery operations of one embodiment according to the present invention.

The slow recovery sequence 412 on FIG. 4C is entered in conventional fashion. In step 414 the recovery and window logic module 306 determines the lost segments for the timed out TCP/IP link by reviewing the SACK scoreboard 308. Knowing the amount of data that must be provided, in step 416 the number of roundtrips needed to provide that many segments according to conventional slow recovery operation which commences with a CWND value of 1 is determined. That value is calculated as follows:

With the default CWND as 1 in slow recovery, window growth represents a geometric sequence as 1, 2, 4, 8, 16 . . . . Thus the number of RTTs to recover the loss can be derived as:

$$N_{RTT} = \lceil \log_2 NPKTS \rceil$$

where $N_{RTT}$ is the number of RTT it will take to do the recovery

NPKTS is the number of maximum segment size lost PKTS recorded in the SACK scoreboard ⌈ ⌉ denotes the ceiling function With the number of roundtrips needed determined, the required time is determined in step 418. That is calculated by the number of round trips needed ($N_{RTT}$) times the RTT: $N_{RTT}$*RTT. In step 420 it is determined if this required time is less than APP_TO. If so, then normal slow recovery can be performed and the initial CWND value is set at 1 in step 422 and a Normal flag is set.

However, if NRTT*RTT is greater than APP_TO, then a fast failover selection is checked in step 421. As an alternative to starting the slow recovery process with NEW_CWND, the determination of (NRTT*RTT) being greater than APP_TO by the TCP transmitter can be used as feedback to the application to perform fast failover as the determination shows that the packets lost in the recovery window cannot be retransmitted within the application set APP_TO with the standard slow recovery approach. As fast failover is generally less disruptive than a full application timeout, a higher level of application performance can be maintained. If fast failover is selected, in step 423 a message is sent to the application to perform fast failover and slow recovery ends.

If fast failover is not selected, a different initial CWND value is determined in step 424. That initial CWND is calculated as follows:

$$NEW\_CWND = \lceil NPKTS/(S-1) \rceil$$

where 'S' is sum of geometric sequence for 'N' iterations with initial value as '1'

'N' is ⌈APP_TO/RTT⌉

If the slow recovery starts with initial CWND as NEW_CWND, then the loss can be recovered before the APP_TO. As this logic is triggered only when the TCP transmitter transitions to slow recovery from fast recovery, the time spent in fast recovery can also be factored in the above equation.

The application can set the mode as "soft", in which case in slow recovery the process starts with CWND as '1' and on receiving an ACK for the retransmitted packet, the process boosts the CWND value to a value related to NEW_CWND for the next transmission, now that connectivity has been confirmed. This is performed by determining if the soft mode is set in step 426. If not, then in step 428 the initial CWND value is set as NEW_CWND and the Normal flag is cleared. If soft mode is selected, in step 430 the initial CWND value is set at 1, a modified value of the NEW_C-MND value is stored for later use and the Normal flag is cleared. The NEW_CMND value is modified as one less RTT will be available for recovery because one RTT will be used for the initial one segment that established connectivity.

After any of steps 422, 428 or 430, slow recovery operations are started in step 432 using the initial CWND value. In step 433 it is determined whether the Normal flag is set. This condition indicates that no alternate CWND value will be needed to accelerate slow recovery to meet application timeout concerns. If the Normal flag is cleared, step 434 determines if soft mode is set. If so, in step 436 the ACK for the first segment sent based on the CWND value of 1 is monitored. When the ACK is received, in step 438 the CWND value is changed to the stored modified NEW_CWND value. After step 438, if soft mode is not set in step 434, or the Normal flag is set in step 433, in step 440 slow recovery proceeds along conventional methods, modified by the use of the SACK scoreboard to reduce the number of segments that need to be sent. In conventional operation all segments starting at the first missing segment are transmitted. This can result in retransmitting segments that have been previously successfully received, this further slowing the slow recovery. Utilizing the SACK scoreboard to retransmit only missing segments reduces the number of segments that have to be sent, eliminating the retransmission of already received segments. This allows the slow recovery operations according to the present invention to use a smaller initial CWND value in certain cases.

By starting the CWND value at a value that will allow the slow recovery process to complete before the application times out, the more disruptive application timeout process can be reduced, so that overall application performance is improved.

While operations above are described using FCIP as examples, it is understood that the present invention will work with more common TCP/IP links as well.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A transmission control protocol (TCP) transmitter comprising:
   a port for transmitting TCP packets and receiving selective acknowledgement (SACK) responses;
   a buffer coupled to said port for storing TCP segments provided by an application that are to be transmitted; and
   logic coupled to said buffer to determine if setting an initial congestion window size at a standard size allows completion of slow recovery operations before an application timeout of the application and to take an alternate approach to recovery when setting the initial congestion window size at a standard size does not allow completion of slow recovery operations before an application timeout of the application when entering slow recovery.

2. The TCP transmitter of claim 1, wherein the alternate approach is to indicate to the application that fast failover should be performed.

3. The TCP transmitter of claim 1, wherein the alternate approach is to set the initial congestion window size at a larger than standard size to allow completion of slow recovery operations before an application timeout of the application.

4. The TCP transmitter of claim 3, further comprising:
a SACK scoreboard coupled to said port and said logic, wherein said logic utilizes information in said SACK scoreboard indicating the number of missing segments to set said initial congestion window size and to transmit segments during slow recovery operations.

5. The TCP transmitter of claim 4, further comprising:
a register for storing an application timeout value (APP_TO); and
a register for storing a round trip time (RTT);
wherein said logic sets the initial congestion window size (CWND) using the following equation:

$$CWND = \lceil NPKTS/(S-1) \rceil$$

where 'S' is sum of geometric sequence for 'N' iterations with initial value as '1'
NPKTS is the number of maximum segment size lost PKTS recorded in said SACK scoreboard,
'N' is $\lceil APP\_TO/RTT \rceil$, and
$\lceil\ \rceil$ is the ceiling function.

6. The TCP transmitter of claim 1, wherein the alternate approach is to set the initial congestion window at a standard size, monitor for an acknowledgement of a segment provided based on the initial congestion window being at a standard size and then change the congestion window size to a larger than standard size to allow completion of slow recovery operations before an application timeout of the application.

7. The TCP transmitter of claim 6, further comprising:
a SACK scoreboard coupled to said port and said logic, wherein said logic utilizes information in said SACK scoreboard indicating the number of missing segments to change the congestion window size to a larger than standard size and to transmit segments during slow recovery operations.

8. A method comprising the steps of:
entering slow recovery operation in a transmission control protocol (TCP) transmitter;
determining if setting an initial congestion window size at a standard size allows completion of slow recovery operations before an application timeout of the application; and
taking an alternate approach to recovery when setting the initial congestion window size at a standard size does not allow completion of slow recovery operations before an application timeout of the application.

9. The method of claim 8, wherein the alternate approach is to indicate to the application that fast failover should be performed.

10. The method of claim 8, wherein the alternate approach is to set the initial congestion window size at a larger than standard size to allow completion of slow recovery operations before an application timeout of the application.

11. The method of claim 10, further comprising:
utilizing information in a selective acknowledgement (SACK) scoreboard indicating the number of missing segments to set the initial congestion window size; and
utilizing information in the SACK scoreboard to transmit segments during slow recovery operations.

12. The method of claim 11, wherein the initial congestion window size (CWND) is computed using the following equation:

$$CWND = \lceil NPKTS/(S-1) \rceil$$

where 'S' is sum of geometric sequence for 'N' iterations with initial value as '1'
NPKTS is the number of maximum segment size lost PKTS recorded in the SACK scoreboard,
'N' is $\lceil APP\_TO/RTT \rceil$,
APP_TO is the application timeout,
RTT is the round trip time, and
$\lceil\ \rceil$ is the ceiling function.

13. The method of claim 8, wherein the alternate approach includes the steps of:
setting the initial congestion window at a standard size;
monitoring for an acknowledgement of a segment provided based on the initial congestion window being at a standard size; and
changing the congestion window size to a larger than standard size to allow completion of slow recovery operations before an application timeout of the application when the acknowledgement is received.

14. The method of claim 13, further comprising:
utilizing information in a selective acknowledgement (SACK) scoreboard indicating the number of missing segments to change the congestion window size; and
utilizing information in the SACK scoreboard to transmit segments during slow recovery operations.

* * * * *